United States Patent [19]
Burkhart et al.

[11] 3,832,837
[45] Sept. 3, 1974

[54] WINDROWER HAVING REAR MOUNTED OVERTOP SWINGABLE TONGUE

[75] Inventors: Merle K. Burkhart; Ferol S. Fell; Cecil L. Case, Newton, Kans.

[73] Assignee: Hesston Corporation, Hesston, Kans.

[22] Filed: Sept. 7, 1973

[21] Appl. No.: 395,347

Related U.S. Application Data

[63] Continuation of Ser. No. 191,521, Oct. 21, 1971, abandoned.

[52] U.S. Cl. ............... 56/218, 56/228, 56/DIG. 1, 172/324, 280/463
[51] Int. Cl. ............................................. A01d 73/00
[58] Field of Search ............ 56/218, 228, 377, 365, 56/366, 370, 371, 1, DIG. 1; 172/324; 280/463; 180/79

[56] References Cited
UNITED STATES PATENTS

| | | | |
|---|---|---|---|
| 1,059,133 | 4/1913 | Felkel | 172/324 |
| 2,316,397 | 4/1943 | Briscoe | 280/463 |
| 2,809,574 | 10/1957 | Hill et al. | 172/324 |
| 2,994,180 | 8/1961 | van der Lely et al. | 56/377 |
| 3,107,476 | 10/1963 | Wathen | 56/377 |
| 3,111,802 | 11/1963 | van der Lely | 56/377 |
| 3,124,921 | 3/1964 | van der Lely et al. | 56/377 |
| 3,339,352 | 9/1967 | Burrough et al. | 56/1 |
| 3,469,381 | 9/1969 | Burrough et al. | 56/209 |
| 3,518,820 | 7/1970 | Yeske | 56/377 |
| 3,672,460 | 2/1971 | Takata | 180/79 |

OTHER PUBLICATIONS
John Deere Pamphlet, entitled "Rakes," A–1740, Ott. 68–8, Litho in U.S.A.

*Primary Examiner*—Russell R. Kinsey
*Attorney, Agent, or Firm*—Schmidt, Johnson, Hovey & Williams

[57] ABSTRACT

A swingable over-the-top tongue is provided for a windrower having a main frame positioned rearwardly of its crop cutting header. The forwardly extending tongue is upwardly arched for clearing the header above which it is disposed and is provided with a hitch at its forward end for attachment to a towing vehicle such as a tractor. The tongue is pivotally coupled to the frame for lateral swinging movement from a field-operating position to a roading position in which the tractor and the windrower are in essentially a straight-line relationship to one another presenting a minimal overall width. The tongue is further constructed in a manner to provide a fluid reservoir for hydraulically powered portions of the windrower.

9 Claims, 4 Drawing Figures

PATENTED SEP 3 1974 3,832,837

WINDROWER HAVING REAR MOUNTED OVERTOP SWINGABLE TONGUE

This is a continuation of U.S. Pat. application Ser. No. 191,521, filed Oct. 21, 1971 and now abandoned.

This invention relates to a swingable tongue for an implement such as a pull-type windrower as is commonly used in the harvesting of alfalfa, grasses, and other forage type crops. The windrower as referred to in the present invention is of the type provided with a header which, by one pass over a field having a crop to be harvested, cuts, conditions and places the latter in a windrow. Whereas the present invention relates strictly to a draft or pull-type implement, the functional purposes and operation of the header portion of the implement is essentially the same as that disclosed and described in U.S. Pat. No. 3,224,177, issued Dec. 21, 1956, in the name of R. A. Adee and having the same assignee as the present invention.

A limiting factor inherent in pull-type windrowers has been the overall width when coupled to a towing tractor due to the fact that the main frame and tongue must be so constructed that the tractor will be offset relative to the header to avoid running down the crop by the tractor wheels as it pulls the windrower through the field. This field operating width is very inconvenient when the windrower is to be taken from one field to another. In many instances, the roads are so narrow that the combined over-all width of the tractor and windrower present a hazard to oncoming traffic. In addition, bridges and gates present other obstacles to the quick and easy movement from one field to another, particularly when the larger size headers are used.

Previous attempts have been made to minimize the width of the tractor and windrower for roading purposes but these have invariably involved the use of devices for reorienting the windrower and the tractor so that the windrower is actually pulled sideways. This usually involves the use of additional carrier wheels and hitches or the physical relocating of the standard components which results in extra expense and a great deal of changeover time whenever the machine is to be moved to another field.

It is, therefore, an important object to provide a main frame and tongue structure for a windrower which permits an overall roading width for the tractor and windrower that is no wider than the header assembly of the windrower.

It is a still further important object of our invention to provide a swingable tongue for a pull-type implement which can be readily and easily adjusted by the vehicle operator without leaving the tractor.

It is another important object of the invention to provide a swingable tongue which permits the overall width of the tractor and windrower to be reduced to a minimum without the use of secondary running gear and hitches.

It is yet another important object of our invention to provide a tongue structure for the main frame of a windrower which does not limit the size header that may be carried thereby.

It is another object of the instant invention to provide a large capacity hydraulic fluid reservoir having an adequate rate of heat dissipation in order to eliminate the need for an auxiliary cooler.

Figure 1:
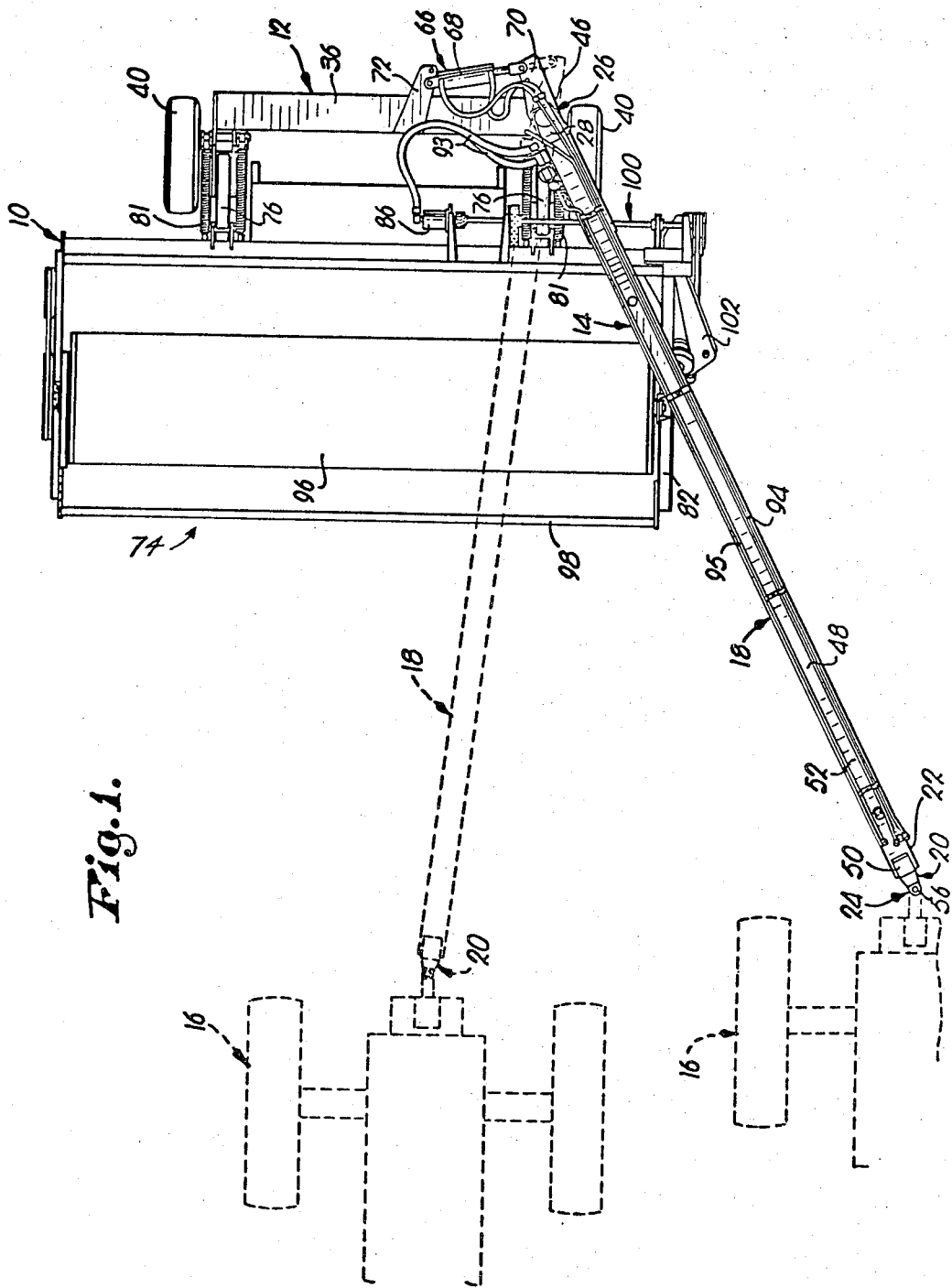
FIG. 1 is a plan view of a windrower provided with a rear mounted overtop swingable tongue shown in field operating position, its towing vehicle indicated in phantom and an alternate or roading position of the tongue and tractor likewise shown in phantom.
Figure 3:
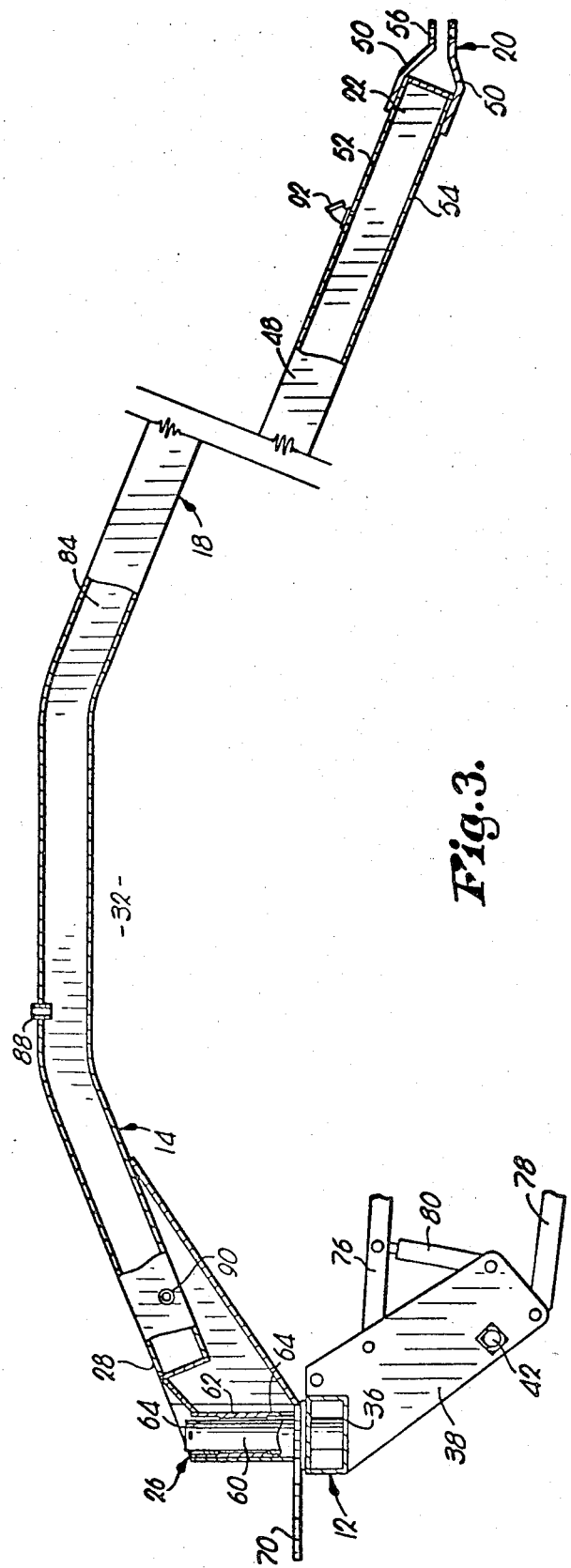
FIG. 3 is an enlarged, fragmentary, vertical, cross-sectional view of the tongue and main frame portions of the windrower, some parts broken away for clarity.
Figure 2:
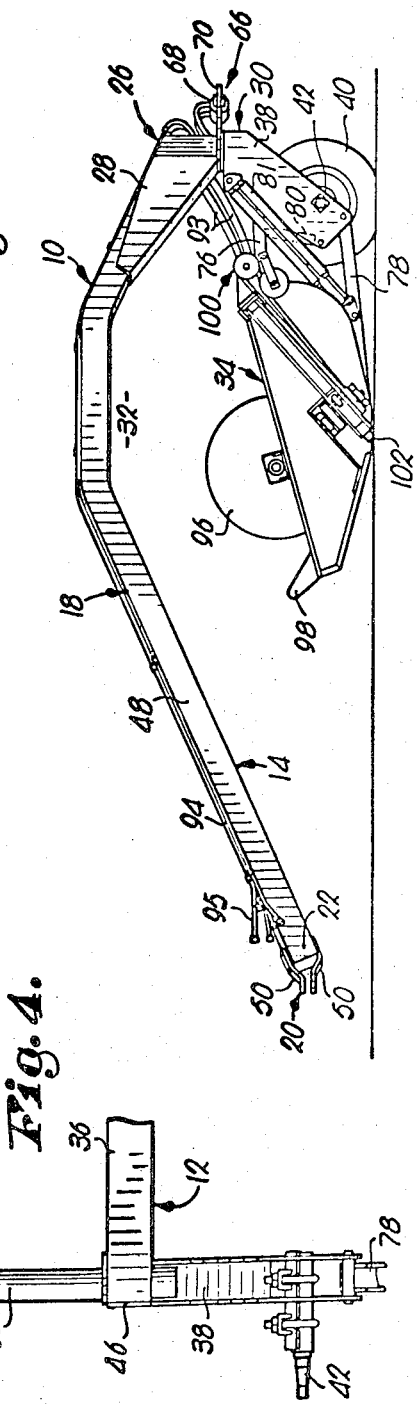
FIG. 2 is a side elevational view of the windrower with the tongue in its field-operating position, one wheel having been removed to show assembly detail.
Figure 4:
FIG. 4 is an enlarged, detailed fragmentary view showing portions of the main frame crosshead, a wheel support arm, and the pivot member for the swingable tongue.

Referring initially to FIG. 1, a farm implement, broadly denoted by the numeral 10, which may be in the nature of a windrower, having a main frame 12 is provided with a structure 14 for transmitting the pull from a vehicle 16, such as a tractor, to the implement 10 as it is towed across a field. Structure 14 comprises an elongated tongue or beam 18 having a hitch 20 at the normally forwardmost end 22 thereof adapted to be connected behind vehicle 16 as at 24 for swinging movement of beam 18 relative to vehicle 16. A coupling 26 at the normally rearmost end 28 of beam 18 connects the latter to frame 12 adjacent rearmost extremities 30 of the same. Beam 18 includes an upwardly extending arch 32 near rearmost end 28 for clearing those portions 34 of implement 10 disposed beneath beam 18 and forwardly of extremities 30 of frame 12.

Frame 12 is generally U-shaped, presenting a transverse, normally horizontal crosshead 36 and a pair of arms 38 secured to and depending from crosshead 36. Implement-supporting, ground-engaging wheels 40 are affixed to the generally lower part of arms 38 by use of spindles 42. Coupling 26 is located on frame 12 adjacent end 46 of crosshead 36.

Beam 18 has a relatively long, straight stretch 48 inclined downwardly and forwardly of arch 32 toward hitch 20; forwardmost end 22 of beam 18, therefore, being at a substantially lower elevation than that of rearmost end 28. Hitch 20 consists of two spaced apart opposed plates 50, each having a hole 56 therein, rigidly affixed to the top and bottom sides 52 and 54 respectively of beam 18, thus permitting the latter to swing about a plurality of axes when hitched or pinned to vehicle 16 as indicated at 24 in FIG. 1.

Coupling 26 is provided with means for permitting swinging movement of beam 18 relative to frame 12. Means for such movement include an elongated pivot member 60 extending upwardly from crosshead 36 for cooperating with a correspondingly elongated, vertically oriented tube 62 affixed to beam 18 at its rearmost end 28. A sleeve bearing 64 is located in each end of tube 62 for engagement with member 60, beam 18 thereby being mounted adjacent end 46 of cross-head 36 for swinging movement relative to the latter and frame 12 about a generally upright axis.

Control means 66 are provided for directing the swinging movement of beam 18 relative to frame 12 and its crosshead 36. Means 66 includes a fluid pressure piston and cylinder assembly 68 having one end pivotally connected to a rearwardly extending arm 70 affixed to beam 18 rearwardly of member 60. The other end of assembly 68 is similarly pivotally connected to a rearwardly extending plate 72 affixed to crosshead 36 intermediate the ends thereof.

Portions 34 of implement 10 include a transverse, elongated header 74 carried forwardly of frame 12 and wheels 40 for vertical swinging movement toward and away from beam 18. The swinging movement of header 74 is accomplished through the use of a pair of upper lift links 76 and a pair of lower lift links 78 interconnecting header 74 with arms 38 working in conjunction with a pair of fluid pressure piston and cylinder assemblies 80 (only one of which is shown) interposed between links 76 and arms 38. A pair of spring assemblies 81 are provided to cooperate with links 76 and 78 and assemblies 80 to yieldably carry header 74 in a semi-suspended state.

Member 60 and means 66 are so located on frame 12 that beam 18 is swingable in one direction about member 60 to a position beyond one end 82 of header 74 as is best illustrated in FIG. 1. The locations of member 60 and means 66 are further related to one another and frame 12 so that the longitudinal axis of the header 74 and the axes of rotation of wheels 40 remain essentially perpendicular to the normal path of travel of implement 10 in any and all positions of swinging movement of beam 18.

The entire length of beam 18 is tubular, presenting a reservoir 84 for the fluid needed to power an assembly such as a hydraulic motor 86 or to pressure any other fluid actuated assembly such as at 68. Beam 18 is provided with a fill spout 88, a fluid return inlet 90 and a fluid outlet 92. If desired, assembly 68 and the pair of assemblies 80 may be operably coupled to the hydraulic system of the vehicle 16 by the use of conduits 94. Conduits 93 and 95 operably connect motor 86 with reservoir 84 and a tractor mounted pump (not shown), reservoir 84 in this instance being used in conjunction with motor 86. Motor 86 is coupled to a drive mechanism 100 which powers reel 96 and sickle 102 of header 74.

In operation, when the windrower 10 is to be taken to a field, it is coupled to vehicle 16 by means of hitch 20 and the hydraulic system of vehicle 16 is connected to conduits 94 after which assembly 68 of control means 66 is extended and pushes against arm 70 thereby swinging beam 18 laterally relative to frame 16 about the vertical axis of member 60 until the vehicle 16 and windrower 10 are in virtual fore and aft alignment as illustrated by the phantom lines in FIG. 1. It will be readily apparent from this figure that the lateral space occupied by the vehicle 16 and windrower 10 will be no more than the overall width of the header 74. The narrower width thereby effected is particularly advantageous and desirable when narrow gates or bridges need to be negotiated while moving the windrower 10 from one location to another as well as the minimizing of interference with oncoming traffic when on a public road.

At the time windrower 10 is to be made field operable, control means 66 is activated by retracting the piston of the assembly 68 to swing beam 18 in the opposite direction which causes forwardmost end 22 as well as vehicle 16 to be positioned laterally beyond end 82 of header 74 as shown by full lines in FIG. 1. This is the normal relative relationship of vehicle 16 to windrower 10 for the cutting and windrowing of a standing crop, thus avoiding overrunning the crop ahead of header 74 by vehicle 16. It is to be noted that regardless of the position of beam 18 with respect to frame 12, the towing vehicle 16 remains forwardly of header 74, and the longitudinal axis of header 74 and the axes of rotation of wheels 40 remain essentially perpendicular to the normal path of travel of the windrower 10.

The distinctive upward arch 32 of beam 18 clears header 74, including its reel 96 and lean bar 98, which permits unrestricted movement of the header 74 as it is raised and lowered by the links 76 and 78 and assemblies 80 from its ground engaging position to a raised transport position. Furthermore, the tubular construction of beam 18 permits it to be used as the hydraulic fluid reservoir 84 for motor 86. Although reservoir 84 is used only for motor 86 in this particular embodiment, it is to be understood that this same reservoir could be utilized in conjunction with control means 66 and header lift assemblies 80 if the hydraulic system of vehicle 16 is inadequate for powering means 66 and assemblies 80, making it necessary to adapt the pump (not shown) to also actuate cylinder assemblies 68 and 80. Beam 18 is particularly adapted for this use in that a large amount of surface area is available which serves to dissipate the heat buildup inherent in hydraulic drives and, therefore, eliminates the need of an auxiliary oil cooler. It is also advantageous in that existing structure can be easily utilized and thus avoid the need to supply an additional structure in the form of an auxiliary reservoir or tank.

Additionally, location of beam 18 relative to frame 12 permits the interchangeable use of headers having various lengths which is not possible when the frame and tongue structure extend laterally and forwardly around end 82 of header 74 as is the case in pull-type windrowers which have heretofore been constructed. The arched configuration eliminates the restrictions imposed by the size of header 74 thereby allowing frame 12 to accommodate any reasonable length. The degree of swing of beam 18 permits the operator to correspondingly adjust the position of his vehicle 16 with respect to the windrower 10 and is again in no way limited by the varying length of header 74.

The ease with which beam 18 may be swung permits the operator to adjust the relative position of the windrower 10 with respect to vehicle 16 in those instances when a wedgeshaped field or land is being cut. As the point of the wedge is approached and a full cut of the header 74 is not required, vehicle 16 can be shifted inwardly toward the center of the windrower 10 thereby reducing the overall width of the vehicle 16 and the windrower 10 to avoid driving over the windrow that has been formed during the previous round. This shifting permits the positioning of windrower 10 relative to the uncut crop so that cutting takes place towards that portion of header opposite end 82.

The increased availability and use of the 75–100 hp tractor as the towing vehicle 16 has created the need for larger pull-type implements, which had declined with the advent of self-propelled machines, provided the excessive width of such a larger machine could be minimized. The reduced overall width and the resulting flexibility of operation afforded by the present invention, eliminates the very inherent restrictions and objections that heretofore had been voiced against the use of pull-type implements.

Having thus described the invention, what is claimed as new and desired to be secured by Letters Patent is:

1. In combination with an elongated header for cutting a crop and forming the cut crop into a windrow or depositing the same in a swath:
 a U-shaped frame having an elongated, horizontal crosshead and a pair of arms integrally secured to the crosshead and depending therefrom,
 said crosshead having a longitudinal axis disposed in perpendicular relationship to the path of travel of the header;
 means mounting said header on the frame forwardly of the crosshead for up-and-down swinging movement relative to the frame;
 a ground-engaging wheel connected directly to each arm respectively at the lower ends thereof for supporting the frame;
 a single, elongated, rigid towing beam having a hitch at the normally forwardmost end thereof adapted to be connected to said vehicle behind the latter for swinging movement of the beam relative to the vehicle about a first upright axis;
 pivot means at the rearmost end of the beam connecting the latter with the crosshead for swinging movement of the beam relative to the frame and the header about a second upright axis; and
 structure interconnecting the frame and the beam for effecting said swinging movement about said second upright axis,
 said beam being arched upwardly over the header for clearing the latter in all positions of its up-and-down swinging movement.

2. The invention as claimed in claim 1 wherein said structure is pivotally coupled with the crosshead and the beam.

3. The invention as claimed in claim 2 wherein said structure comprises a fluid pressure piston and cylinder assembly.

4. The invention as claimed in claim 2 wherein said structure couples with the beam rearwardly of said pivot means.

5. The invention as claimed in claim 1 wherein said beam is tubular presenting a hydraulic fluid reservoir.

6. The invention as claimed in claim 1 wherein said pivot means is disposed rearwardly of the axes of rotation of said wheels.

7. The invention as claimed in claim 1 wherein said pivot means is disposed at one end of the crosshead adjacent one of the arms.

8. The invention as claimed in claim 1 wherein said arms slope downwardly and forwardly from said crosshead placing the axes of rotation of the wheels forwardly of the crosshead.

9. The invention as claimed in claim 1 wherein said header has a longitudinal axis parallel with said axis of the crosshead.

* * * * *

UNITED STATES PATENT AND TRADEMARK OFFICE
CERTIFICATE OF CORRECTION

PATENT NO. : 3,832,837
DATED : September 3, 1974
INVENTOR(S) : Burkhart, Merle K., et al.

It is certified that error appears in the above-identified patent and that said Letters Patent are hereby corrected as shown below:

In Claim 1 at line 21 of column 5, delete "said" and insert -- a --.

Signed and Sealed this

Eighth Day of April 1980

[SEAL]

Attest:

SIDNEY A. DIAMOND

Attesting Officer

Commissioner of Patents and Trademarks